United States Patent [19]

Fischer

[11] Patent Number: 4,791,518
[45] Date of Patent: Dec. 13, 1988

[54] DEVICE FOR DETECTING INTERFERING ARCS

[75] Inventor: Rudolf Fischer, Riedt-Neerach, Switzerland

[73] Assignee: BBC Brown Boveri AG, Baden, Switzerland

[21] Appl. No.: 53,746

[22] Filed: May 26, 1987

[30] Foreign Application Priority Data

Jun. 9, 1986 [CH] Switzerland ............ 2322/86

[51] Int. Cl.$^4$ .............................................. H02H 3/00
[52] U.S. Cl. ........................................ 361/2; 356/256
[58] Field of Search ................ 361/1, 2, 42; 356/256; 340/600

[56] References Cited

U.S. PATENT DOCUMENTS

| 4,369,364 | 1/1983 | Kuntermann . | |
| 4,461,571 | 7/1984 | Killion | 361/1 X |
| 4,685,018 | 8/1987 | Tada et al. | 361/1 |

FOREIGN PATENT DOCUMENTS

| 0103921 | 3/1984 | European Pat. Off. . |
| 0126270 | 11/1984 | European Pat. Off. . |
| 2840790 | 4/1980 | Fed. Rep. of Germany . |
| 3141374 | 4/1983 | Fed. Rep. of Germany . |
| 8001442 | 7/1980 | PCT Int'l Appl. . |

OTHER PUBLICATIONS

Elektrotechnische Zeitschrift, E.T.Z., Band 105, Nr. 13, Juli 1984 (DE), G. Schwarz: "Schneller Storlichtbogenschutz fur Schaltanlagen", pp. 672-678.

Primary Examiner—A. D. Pellinen
Assistant Examiner—Derek S. Jennings
Attorney, Agent, or Firm—Burns, Doane, Swecker & Mathis

[57] ABSTRACT

An electrical system preferably constructed as gas-insulated, metal-encapsulated switching system containing at least one electrical switch located in a darkened internal space is monitored by a device for detecting interfering arcs. In this arrangement, the light pulses emanating from the interfering arcs in the internal space are optically detected, conducted out and converted into electrical signals which are processed in an evaluating device. The monitoring device should be distinguished by a short response time. This is achieved by applying electrical signals, which are attributable both to interfering arcs and to regular switching arcs, to the evaluating device and by the fact that the evaluating device also contains a circuit arrangement which detects the variation with time of the electrical signals. In this circuit arangement, the electrical signals attributable to interfering arcs are distinguished from signals attributable to regular switching arcs.

11 Claims, 3 Drawing Sheets a)

b)

DEVICE FOR DETECTING INTERFERING ARCS

BACKGROUND OF THE INVENTION

The present invention relates to a device for detecting interfering arcs in a darkened first internal space, containing at least one electric switch, of an electrical system. More particularly, the present invention relates to a device for detecting arcs in an electric system including an optical sensing system having an evaluating device for processing signals from an optical sensor.

Such a device is known, for instance, from European Pat. No. A1-0 126 270. The known device enables unwanted interfering arcs to be reliably detected in a gas-insulated, metal-encapsulated high-voltage switching system. However, in the known device it is necessary to cut out switching arcs generated by operational switching actions during their entire duration of burning. During the cutting-out period, it is not possible to detect interfering arcs which occur, for instance as a result of insulation faults and can lead to damage to the entire system. Undesirably long cutting-out periods are required particularly in the case of isolating or grounding switches because of the duration of burning of a switching arc which lasts up to a second.

BRIEF SUMMARY OF THE INVENTION

The present invention achieves the object of creating a device for detecting interfering arcs in an electrical system which makes it possible to indicate interfering arcs which may occur within a time interval which is comparatively short as compared with the duration of burning of a switching arc of an isolating or grounding switch.

The device according to the invention enables an electrical system to be selectively monitored for interfering arcs within a fraction of the duration of burning of the switching arc of an isolating or grounding switch of this system. This significantly reduces the risk of damage to an electrical system due to interfering arcs. In addition, it is also advantageous that electrical systems already in existence can be retrofitted without problems.

BRIEF DESCRIPTION OF THE DRAWINGS

In the text which follows, the invention is explained in greater detail with the aid of an illustrative embodiment illustrated in the drawing, in which.

DETAILED DESCRIPTION OF THE PREFERRED EMBODIMENT

Figure 1:
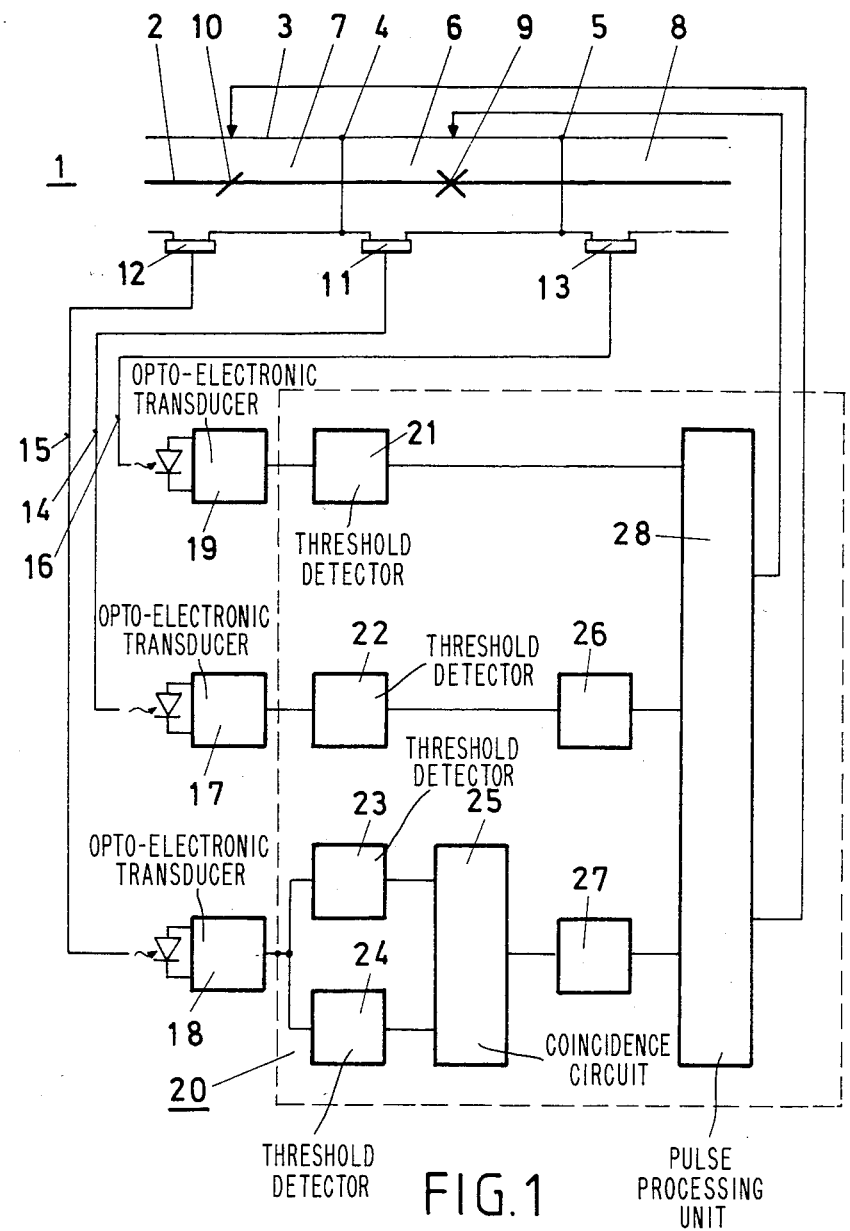
FIG. 1 shows a block diagram of a device, designed in accordance with the invention, for detecting interfering arcs in a high-voltage switching system.

In FIG. 1, reference numeral 1 designates a metal-encapsulated high-voltage switching system comprising a high-voltage-conducting conductor 2 and a metal encapsulation 3 which encloses the conductor 2 and is filled with an insulating gas. The conductor 2 is carried by two insulators 4, 5 which delimit three darkened and gas-tight internal spaces 6, 7, 8 in the high-voltage switching system 1. In the internal space 6, a high-voltage circuit breaker 9 is provided and in the internal space 7 a high-voltage isolating or high-voltage grounding switch 10 is provided. In contrast, internal space 8 is not provided with any switching gear and can contain, for example, a current or voltage transformer.

The metal encapsulation 3 has openings which are not designated and are in each case associated with one of the internal spaces 6, 7, 8 and which are in each case sealed in a gas-tight manner by transparent glass windows 11, 12, 13. On the external surfaces of the glass windows 11, 12, 13 light-rejecting layers, not designated, and in each case one end of one of three optical waveguides 14, 15, 16 are attached. The other end of each of the three optical waveguides acts in each case on the input of one of three opto-electronic transducers 17, 18, 19.

The outputs of the opto-electronic transducers 17, 18, 19 act in each case on inputs of an evaluating device 20 for processing the electrical signals supplied by the opto-electronic transducers 17, 18, 19 in accordance with particular criteria described in the text which follows. These criteria allow a distinction to be made between light pulses which originate from regular switching arcs, occurring, for instance, during the opening or closing of the high-voltage circuit breaker 9, or unwanted interfering arcs occurring, for instance, during insulation flashovers. If an interfering arc is detected, the evaluating device 20 forms an output signal which acts on the components which short-circuit the interfering arc, such as, for instance, a high-speed grounding switch, not shown, of the high-voltage switching system 1.

The evaluating device 20 comprises four threshold detectors 21, 22, 23, 24 which accept the electrical output signals of the opto-electronic transducers 17, 18, 19, and a coincidence circuit 25, two timing sections 26 and 27 and a pulse processing unit 28. In this arrangement, the input side of the threshold detector 21 is effectively connected to the output of the opto-electronic transducer 19 and the output side is effectively connected to one input of the pulse processing unit 28 and, correspondingly, the input side of the threshold detector 22 is effectively connected to the output of the opto-electronic transducer 17 and the output side is effectively connected via timing section 26 to another input of the pulse processing device 28 and the input side of the threshold detectors 23 and 24 are in each case connected to the output of the opto-electronic transducer 18 and the output side is in each case connected to one of two inputs of the coincidence circuit 25. The output of the coincidence circuit 25 acts on the pulse processing unit 28 via timing section 27.

Figure 2:
FIG. 2 shows the variation with time of the light intensity $\Phi$ of arcs which occur in the internal space of the high-voltage switching system monitored by the device according to FIG. 1.
Figure 2:
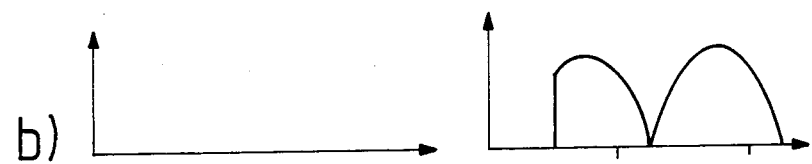
Figure 2:
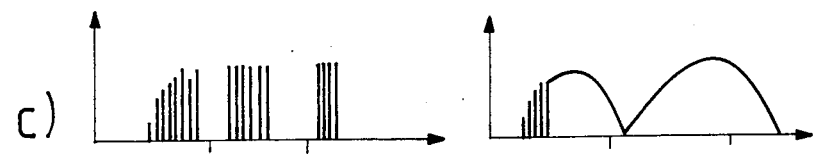
Figure 2:
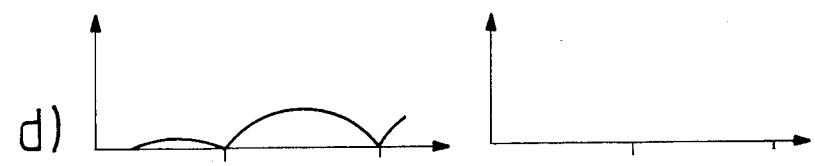
Figure 2:
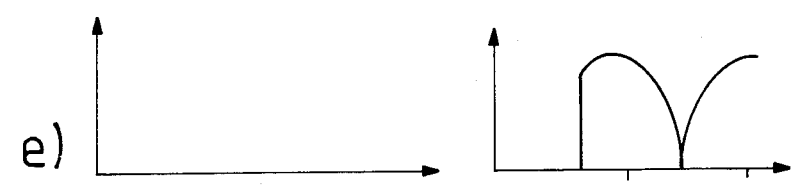
Figure 2:
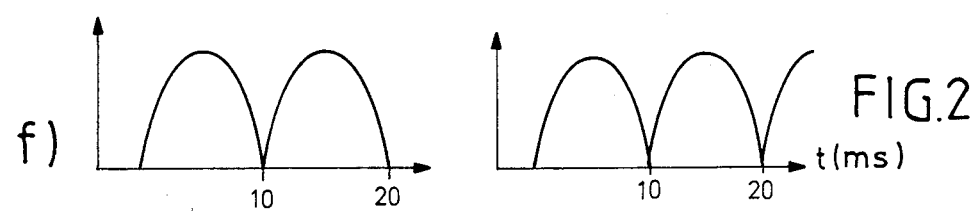

FIG. 2 shows the variation with time of the light intensity $\Phi$ of arcs which can occur in the internal spaces 6, 7 and 8 of the high-voltage switching system 1.

In the switch-free internal space 8, no switching arc occurs during a switching action of the high-voltage switching system. The internal space 8 therefore remains dark (FIG. 2 (a), left-hand illustration).

In the event of a fault, an interfering arc occurs in the internal space 8 the light intensity of which fluctuates as a function of the frequency of the current conducted in conductor 2 (FIG. 2 (a), right-hand illustration).

In the internal space 7 containing the high-voltage isolating or high-voltage grounding switch 10, it is normally dark without switching action (FIG. 2 (b), left-hand illustration).

When a capacitive current is switched, a switching arc occurs with short, steep light pulses. If the optical power subsequently specified is related to a photodiode of an opto-electronic transducer, with indirect observation of the arc from a distance of approximately 1 m, using an optical waveguide having low attenuation and a diameter of 200 $\mu$m, these light pulses typically display a change in light intensity of $d\Phi/dt > 10$ nW/$\mu$s and a duration of a maximum of 150 $\mu$s in each case (FIG. 2 (c), left-hand illustration).

If an inductive current is switched, a switching arc occurs which has long-duration and slowly rising light pulses. With the assumption of the previously specified measuring conditions, such light pulses display a change in light intensity of $d\Phi/dt < 1$ nW/$\mu$s and a duration of greater than 1 ms (FIG. 2 (d), left-hand illustration).

In case of a fault, at least one pulse originating from an interfering arc occurs in the internal space 7 both in the rest condition (FIG. 2 (b), right-hand illustration) and during the switching of a capacitive current (FIG. 2 (c), right-hand illustration), which has a duration of longer than 1 ms and displays a change in light intensity of greater than 10 nW/$\mu$s.

Since the occurrence of an interfering arc is improbable during the switching of an inductive current, such a fault case can be excluded (FIG. 2 (d), right-hand illustration).

In the rest condition, it is normally dark in the internal space 6 containing the high-voltage circuit breaker 9 (FIG. 2 (e), left-hand illustration).

During a switching action, long-duration light pulses originating from the switching arc occur which have decayed after only 25 ms (FIG. 2 (f), left-hand illustration).

In the event of a fault, interfering arcs occur both in the rest condition (FIG. 2 (e), right-hand illustration) and during a switching action (FIG. 2 (f), right-hand illustration) which are still burning after 25 ms.

If then an interfering arc occurs in the internal space 8, its light pulses are detected by sensor 13 and supplied via the optical waveguide 16 to the opto-electronic transducer 19. The electrical signals generated from the light pulses by the transducer 19 act on the threshold detector 21. The threshold detector 21 responds above a predetermined limit value of the amplitude of the electrical signals and supplies a fault signal indicating the occurrence of an interfering arc to the pulse processing device 28.

If an arc occurs in the internal space 6 containing the high-voltage circuit breaker 9, this can be a switching arc, an interfering arc or a swtiching and an interfering arc. The criteria previously specified can then be used to decide in a simple manner whether an interfering arc is burning or not. During this process, the light pulses emitted via the sensor 11 and the optical waveguide 14 to the opto-electronic transducer 17 are converted into electrical signals. Above a predetermined limit value of the amplitude of the electrical signals, the threshold detector 22 emits an output signal which acts on the timing section 26. If this signal is still acting on the timing section 26 after a predetermined time difference of, for example, 25 ms, this timing section emits a signal signalling an interfering arc to the pulse processing unit 28. However, if the ouput signal has disappeared before this time difference has elapsed, for example after 5 or 10 ms, in the case of a regular switching action, the timing section 26 does not emit a signal.

If an arc occus in the internal space 7 containing the high-voltage isolating or high-voltage grounding switch 10, this can be a switching arc, an interfering arc or a switching and an interfering arc in this case, too. The criteria previously specified can also be used in this case to decide in a simple manner whether an unwanted interfering arc is burning. During this process, the light pulses supplied to the opto-electronic transducer 18 via the sensor 12 and the optical waveguide 15 are converted into electrical signals. Above a prdetermined limit value of the slope of the edge of the electrical signals, the threshold detector 23 emits an output signal acting on the first input of the coincidence circuit 25. Above a predetermined limit value of the amplitude of the electrical signal, the threshold detector 24 emits an output signal acting on a second input of the coincidence circuit 25. The output of the coincidence circuit 25 becomes active if a signal is present at the first input when a positive edge occurs at the second input. The output of the coincidence circuit 25 remains active for as long as its second input connected to the output of the threshold detector 24 is activated. During this period, the first input connected to the output of the threshold detector 23 has no influence on the behavior of the coincidence circuit 25. On occurrence of an output signal at the coincidence circuit, the timing section 27 checks whether this signal lasts longer than a predetermined time difference of, for example, 1 ms. If this is the case, it emits a signal signalling the occurrence of an interfering arc to the pulse processing unit 28.

Figure 3:
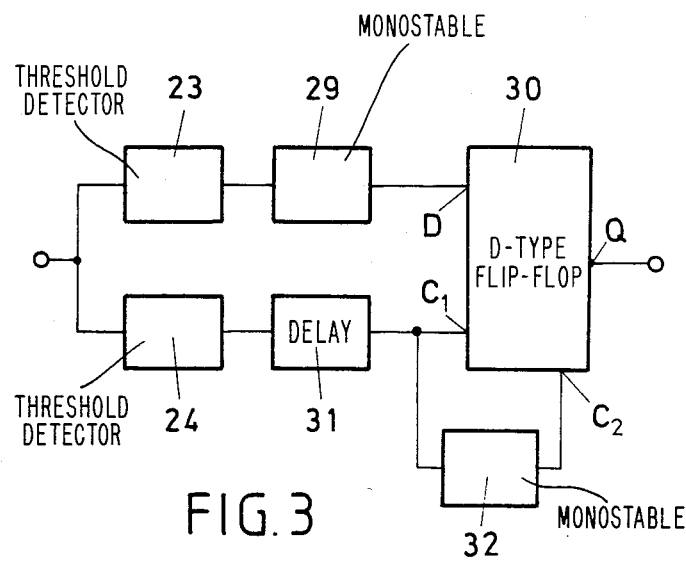
FIG. 3 shows a circuit diagram of a circuit arrangement of the device according to FIG. 1 for detecting electrical signals which are associated with the variation with time of the light intensity $\Phi$.

FIG. 3 shows a circuit diagram of a circuit arrangement suitable for processing the electrical signals supplied by the opto-electronic transducer 18. In this circuit arrangement, the output of the threshold detector 23 acts via a positively edge-triggered monostable flip-flop 29, having a signal width of, for example, 1 $\mu$s, on a data input D of a positively edge-triggered D-type flip-flop 30 and the output of the threshold detector 24 acts via a delay section 31 having a signal delay time of, for example, 0.5 $\mu$s, on a clock input $C_1$ of the D-type flip-flop 30, on the one hand, and, on the other hand, via a negatively edge-triggered monostable flip-flop 32, having a signal width of, for example, 1 $\mu$s, on a clear input $C_2$ of the D-type flip-flop 30.

Figure 4:
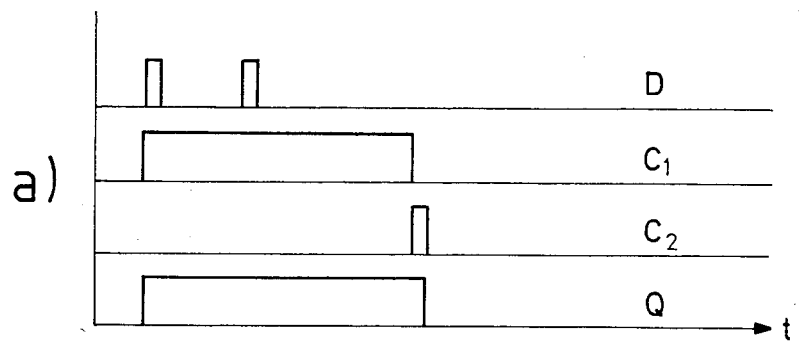
FIG. 4 shows the variation with time of the electrical signals in the circuit arrangement according to FIG. 3.
Figure 4:
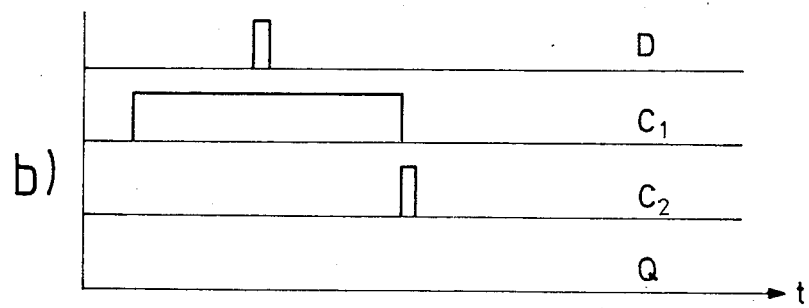

If a signal having a positive edge occurs at the clock input $C_1$ as shown in FIG. 4 (a), the signal present at data input D passes to output Q (coincidence effect). A signal formed at the output Q remains in existence for as long as a positive signal exists at clock input $C_1$ and thus no negative edge of the signal applied to clock input $C_1$ acts on the clear output $C_2$ via the monostable flip-flop 32. If the clock signal, which depends on the arc duration, is longer than the predetermined time difference of, for example, 1 ms, the timing section 27, not shown in FIG. 3, passes a fault signal indicating the occurrence of an interfering arc to the pulse processing unit 28. If the negative edge of the signal present at clock input $C_1$ and at monostable flip-flop 32 comes into effect, the negatively edge-triggered monostable flip-flop 32 emits a signal acting on the clear input $C_2$ of the D-type flip-flop 30 as a result of which the output Q of the D-type flip-flop 30 is cleared again.

If the signal present at the data input D and the edge present at clock input $C_1$ do not occur at the same time (for instance during a pulse-type disturbance), as shown in FIG. 4 (b), no output signal reaches the output Q of the D-type flip-flop 30 and no fault signal indicating an interfering arc is formed, either.

The principles, preferred embodiments and modes of operation of the present invention have been described in the foregoing specification. The invention which is intended to be protected herewith, however, is not to be construed as being limited to the particular forms disclosed, since these are to be regarded as illustrative rather than restrictive. Variations and changes may be made by those skilled in the art without departing from the spirit of the invention.

What is claimed is:

1. Device for detecting interfering arcs in a darkened first internal space, containing at least one electric switch, of an electric system comprising at least
    a first optical sensor for detecting the light pulses of interfering arcs in the first internal space,
    a first optical waveguide for conducting the light pulses by the first sensor out of the first internal space,
    a first opto-electronic transducer for converting the light pulses conducted out into first electrical signals, and
    an evaluating device for processing the first electrical signals,
    characterized in that the first electrical signals, which are converted in the first opto-electronic transducer and which are attributable both to interfering arcs and to regular switching arcs are applied to the evaluating device, and in that the evaluating device contains a circuit arrangement which detects the variation with time of the first electrical signals and which distinguishes between the electrical signals attributable to interfering arcs and signals attributable to regular switching arcs.

2. Device according to claim 1, comprising a high-voltage circuit breaker provided in the first internal space, characterized in that the circuit arrangement has a threshold detector which is controlled by the amplitude of the first electricl signals and a timing section which follows the threshold detector and checks the duration of the first electrical signals.

3. Device according to claim 2, characterized in that the timing section has a setting time of at least 25 ms.

4. Device according to claim 1, comprising a high-voltage isolating or high-voltage grounding switch provided in the first internal space, characterized in that the circuit arrangement has a first threshold detector controlled by the slope of the edge of the first electrical signals and a second threshold detector controlled by the amplitude of the first electrical signals and a coincidence circuit the inputs of which are acted upon by the outputs of the first and of the second threshold detector, and a first timing section which follows the coincidence circuit and checks the duration of the output signals of the coincidence circuit.

5. Device according to claim 4, characterized in that the first threshold detector responds due to a light pulse the slope of the edge of which is above a predetermined limit value, the second threshold detector responds due to a light pulse the amplitude of which is above a predetermined limit value and the first timing section responds due to an input signal which exceeds a predetermined setting time.

6. Device according to claim 4, characterized in that the coincidence circuit has a D-type flip-flop the data input of which is acted upon by the output of the first threshold detector and the clock input of which is acted upon the output of the second threshold detector.

7. Device according to claim 6, characterized in that a positively edge-triggered monostable flip-flop is connected between the first threshold detector and the data input of the D-type flip-flop, and a negatively edge-triggered monostable flip-flop is connected between clock input and a clear input of the D-type flip-flop.

8. Device according to claim 4, comprising a high-voltage circuit breaker provided in a second internal space, containing at least
    a second optical sensor for detecting the light pulses of interfering arcs in the second internal space,
    a second optical waveguide for conducting the light pulses detected by the second sensor out of the second internal space, and
    a second opto-electronic transducer for converting the light pulses conducted out into second electrical signals supplied to the evaluating unit,
    characterized in that the circuit arrangement has a third threshold detector controlled by the amplitude of the second electrical signals and a second timing section which follows the third threshold detector and checks the duration of the second electrical signals.

9. Device according to claim 8, comprising a third internal space containing at least
    a third optical sensor for detecting the light pulses of interfering arcs in the third internal space,
    a third optical waveguide for conducting the light pulses detected by the third sensor out of the third internal space, and
    a third opto-electronic transducer for converting the light pulses conducted out into third electrical signals supplied in the evaluating unit,
    characterized in that the circuit arrangement has a fourth threshold detector controlled by the amplitude of the third electrical signals.

10. A device for extinguishing interfering arcs in a normally darkened internal space containing a high-voltage circuit breaker, comprising:
    light detector means for detecting light pulses resulting from electrical arcs in said internal space and producing an output digital signal having an amplitude and a duration representative of the respective amplitude and duration of said light pulses;
    a threshold detector which is operatively coupled with said light detector means and which produces an indicator signal whenever the amplitude of said light detector means output signal is above a predetermined threshold amplitude level, the duration of said indicator signal being equal to the time period during which the amplitude of said output signal is above said predetermined threshold amplitude level;
    timing means operatively coupled with said threshold detector for monitoring said indicator signal and, when the duration of said indicator signal exceeds a predetermined threshold duration value thereby indicating an interfering arc, generating a control signal; and
    means responsive to said control signal for extinguishing said interfering arc.

11. A device for extinguishing interfering arcs in a normally darkened internal space containing a high-voltage grounding switch, comprising:

light detector means for detecting light pulses resulting from electrical arcs in said internal space and producing an output digital signal having an amplitude and a duration representative of the respective amplitude and duration of said light pulses;

a first threshold detector which is operatively coupled with said light detector means and which produces a first indicator signal whenever a rate of increase of the amplitude of said light detector means output signal is above a predetermined threshold level;

a second threshold detector which is operatively coupled with said light detector means and which produces a second indicator signal whenever the amplitude of said light detector means output signal is above a predetermined threshold amplitude level, the duration of said second indicator signal being equal to the time period during which the amplitude of said output signal is above said predetermined threshold amplitude level;

a coincidence circuit having a first input terminal operatively coupled with said first threshold detector and a second input terminal operatively coupled with said second threshold detector, said coincidence circuit producing a coincidence signal when said first indicator signal is being produced as said second threshold detector begins producing said second indicator signal, the duration of said coincidence signal being equal to the duration of said second indicator signal;

timing means operatively coupled with said coincidence circuit for monitoring said coincidence signal and, when the duration of said coincidence signal exceeds a predetermined threshold duration value thereby indicating an interfering arc, generating a control signal; and means responsive to said control signal for extinguishing said interfering arc.

* * * * *